July 15, 1941.   J. KOLBE   2,249,212
VEHICLE BODY SUSPENSION MEANS
Filed Sept. 30, 1938
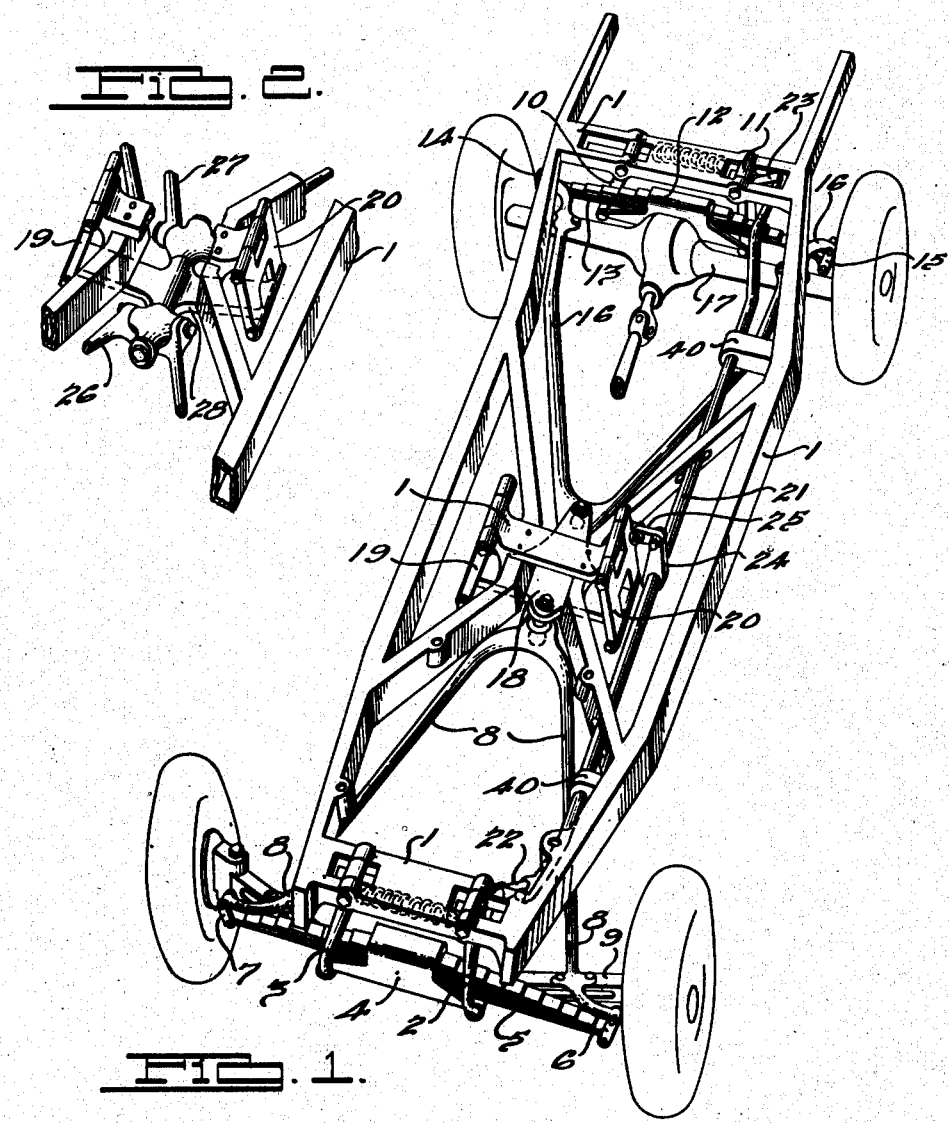
INVENTOR
Joachim Kolbe.
BY
Pike, Calver & Gray
ATTORNEYS.

Patented July 15, 1941

2,249,212

UNITED STATES PATENT OFFICE 2,249,212

VEHICLE BODY SUSPENSION MEANS

Joachim Kolbe, Hanover, Germany

Application September 30, 1938, Serial No. 232,660

10 Claims. (Cl. 280—124)

Devices are known the object of which is to bring the superstructure or body of motor vehicles, while negotiating a curve, into an inclined position towards the center of the curve, under the influence of the centrifugal force developed as the vehicle rounds the curve, so that the passengers in the vehicle practically will not feel the centrifugal force or side thrust. In some such arrangements the superstructure is connected by suitable guiding elements with the wheel supporting means or axles of the vehicle. The guiding elements consist of inclined link members or curve guides and so on. In order to have equidirectional movement of the guiding elements, these elements of the front axle and of the rear axle are preferably positively coupled, for instance by means of a shaft rotatably journalled to the frame of the vehicle and having a lever and a suspension means or equivalent structure at each end.

Since in such devices the frame of the superstructure, which is supported by the link system, must be allowed to swing to the sides above these systems and the axles in response to lateral pressure, this frame cannot be used as a means for taking up, at a distance from the axles, the rods which hold the wheel supporting means or axles in position. Such a means, however, is of importance especially in motor vehicles of the so-called rigid-axle type, since holding the axles in position by means of rods such for example as radius rods is an important factor in the economical manufacture of a durable chassis. It is the object of this invention to provide a means to which these rods can be connected, and this object is achieved by placing on the frame a third system of guiding elements at a distance from the axles of the vehicle, this system being designed for the same motion of the center of gravity as the systems near the front axle and near the rear axle. For large motor vehicles, a fourth, fifth system and so on may be provided. The connecting element between the lower joints in the system, or base plate, is used as a means to which the rods are connected which hold the axles in position. It is useful to connect this system of guiding elements to the positive coupling which connects the front axle guiding system and the rear axle guiding system. However, the rods for the axles may also be connected to this additional system of guiding elements in such a manner that a positive coupling of the front and rear systems can be done without entirely.

Having the base plate mentioned above for connecting the rods which hold the axles in position brings additional advantages. The joints of the systems of guiding elements at the axles, being protected against excessive stress on the bearings, may be shorter. Either the upper or the lower joints of these systems, which need not any longer take up bending or torsional stress, may be ball joints.

The invention is illustrated by two constructional examples in the accompanying drawing.

Fig. 1 is a perspective view of one constructional example in a so-called rigid-axle type of motor vehicle having transverse leaf springs.

Fig. 2 shows a connecting member of the lower ends of the links, or base plate, in an additional system, the plate being connected to the means for taking up the rod connections between the front and rear link or guiding systems in such a manner that a positive coupling of the front and rear axle guiding systems can be done without.

According to Fig. 1 the superstructure of the vehicle, of which only the frame 1 is shown, is supported on the spring 5 at the front axle by means of the guiding links 2 and 3 and the axle box or spring saddle 4. The spring 5 is suspended by the shackles 6 and 7 to the ends of rods 8 which are positively connected to the rigid axle 9.

At the rear, the frame 1, the place of which may be taken by a so-called frameless body, is supported on the spring 13 by means of the guiding links 10 and 11 and an axle box or spring saddle 12. The spring 13 is suspended by the shackles 14 and 15 to the ends of rods 16 which are positively connected to the rigid axle 17. The arcs formed at the connection of rods 8 and 16 are connected to a base plate 18 by means of ball or other suitable joints. This plate 18 is pivotally connected to the guiding links 19 and 20 which are hung in turn pivotally connected to the frame 1 at their upper joints.

The shaft 21, coupling the front link system 2 and 3 with the rear link system 10 and 11 by means of suspension members or arms 22 and 23, is rotatably journalled to the frame 1 by the embossments 40. The additional link system 19 and 20 is connected to this shaft 21 by means of lever 24 and suspension means such as an arm 25.

When the vehicle is subjected to lateral forces such as the centrifugal force developed when the vehicle rounds a corner, the superstructure represented by the frame 1 may shift laterally on the links 2, 3; 10, 11, and 19, 20 to an inclined or banked position relative to the wheel supporting means or axles 9 and 17. The shaft 21 interconnecting the front and rear links and the intermediate links 19, 20 through the base plate 18 which holds the radius rods 8 and 16 in constant angular relation to the wheel supporting means or axles 9 and 17, holds the entire superstructure in a constant angular relation relative to the wheel supporting means and radius rods during the movement of the superstructure to the inclined or banked position.

Fig. 2 shows a design modified of the base plate 28 connecting the links 19 and 20, designed so as to permit the front and rear rod pairs 26 and 27 to restrain the axle motion at approximately right angles to the direction of travel of the vehicle. The rod ends 26 and 27 and therewith the axles 9 and 17 can oscillate vertically but cannot move laterally and can effect rotary motions around the axis which approximately connects the midpoints of the front and rear leaf springs 5 and 13 respectively. This prevents the centers of the axle boxes or spring saddles 4 and 12 from moving out to the right or left with reference to the plate 18. Since the upper joints of the links are connected among themselves through the frame 1 only, the link systems can only enter upon equidirectional movements.

With this design it is unnecessary to employ the connecting means such as the shaft 21 between the front and rear links or supporting means because lateral displacement of one end of the superstructure is transmitted through the rods 26 and 27 and the base plate 28 to move the other end of the superstructure to maintain the angularity of the superstructure and the lateral displacement thereof constant relative to the wheel supporting means or axles.

The device is suitable for independently sprung cars as well, as the link joints, the axle boxes and the rods which hold the wheels in position may be lighter if a connection to a member such as base plate 18 is provided.

The base plate suggested here, which in passenger motor cars is suitably placed underneath the front seats, thus makes it possible to use less weight in the building of the car and to avoid excessive stress on the frame. Especially does this device make it possible, when building motor vehicles of the so-called rigid-axle type, to use constructional elements which have long been tested in practice and thus to give low priced cars the advantages which result from the banking effect.

I claim:

1. In a motor vehicle having front and rear wheel supporting means, a superstructure, connecting means between the wheel supporting means and superstructure, forwardly and rearwardly extending radius rods associated with the front and rear wheel supporting means, and connecting means between said radius rods and the superstructure cooperating with the first named connecting means to enable the superstructure to assume an inclined or banked position accompanied by a lowering of the center of gravity of the superstructure relative to the wheel supporting means under the influence of lateral forces.

2. In a motor vehicle having front and rear wheel supporting means including rigid axles, a superstructure, connecting means including paired angularly inclined links between the wheel supporting means and superstructure, forwardly and rearwardly extending radius rods fixed to the rigid axles, and connecting means between said radius rods and the superstructure cooperating with the first named connecting means whereby the superstructure may assume an inclined or banked position accompanied by a lateral shifting and a lowering of its center of gravity relative to the wheel supporting means under the influence of lateral forces.

3. In a motor vehicle having front and rear wheel supporting means including rigid axles, a superstructure, connecting means comprising paired front and rear angularly inclined links interposed between the wheel supporting means and superstructure, resilient means interposed between said links and axles, radius rods fixed to said axles and extending rearwardly and forwardly therefrom, and connecting means comprising auxiliary paired angularly inclined links interposed between the radius rods and superstructure and cooperating with the first named links to enable the superstructure to assume an inclined or banked position accompanied by a lateral shifting thereof relative to the wheel supporting means under the influence of lateral forces.

4. A vehicle having front and rear rigid axles, resilient means associated with said axles, front and rear radius rods fixed to said axles, a superstructure, a base plate angularly movable relative to the superstructure and pivotally connected to the radius rods, and means connecting the front and rear resilient means and base plate to the superstructure whereby the superstructure may assume an inclined or banked position under the influence of lateral forces developed as the vehicle rounds a curve.

5. In a motor vehicle having wheel supporting means including front and rear rigid axles, radius rods fixed to said axles, resilient means carried by the radius rods adjacent the axles, a base plate interconnecting the radius rods intermediate the front and rear wheel supporting means, and connecting means comprising paired angularly inclined links interposed between the resilient means base plate and superstructure whereby the superstructure may assume an inclined or banked position when subjected to lateral forces.

6. In a motor vehicle having rigid front and rear axles, generally longitudinally extending radius rods fixed to said axles, a superstructure, resilient means between the superstructure and axles, paired angularly disposed links between the superstructure and resilient means whereby the superstructure may assume an inclined or banked position accompanied by lateral movement thereof relative to the axles, a plate engaging said radius rods, and means comprising angularly inclined links interposed between said plate and superstructure to maintain the radius rods in fixed angular relation relative to the axles as the superstructure is moved to an inclined or banked position accompanied by a lateral shifting thereof relative to the axles.

7. In a motor vehicle having rigid front and rear axles, generally longitudinally extending radius rods fixed to said axles, a superstructure, resilient means between the superstructure and axles, paired angularly disposed links between the superstructure and resilient means whereby the superstructure may assume an inclined or banked position accompanied by lateral movement thereof relative to the axles, a plate engaging said radius rods, means comprising angularly inclined links interposed between said plate and superstructure to maintain the radius rods in fixed angular relation relative to the axles as the superstructure is moved to an inclined or banked position accompanied by a lateral shifting thereof relative to the axles, and means comprising a longitudinally extending motion transmitting means carried by the superstructure and operably connected to at least one of said links of each pair to maintain longitudinally spaced points of the superstructure at substantially constant angular relation relative to the axles as the superstructure assumes an inclined or banked position.

8. A motor vehicle comprising front and rear wheel supporting means including rigid axles and generally longitudinally extending radius rods fixed to said axles, a superstructure, connecting means comprising paired angularly inclined links between the superstructure and wheel supporting means whereby the superstructure may assume an inclined or banked position relative to the wheel supporting means when subjected to lateral forces, a plate, paired angularly inclined links between the plate and superstructure to maintain the plate in the same position relative to the axles and radius rods when the superstructure assumes an inclined or banked position, and means connecting the radius rods to said plate whereby the axles may oscillate vertically relative to and laterally with the base plate.

9. In a motor vehicle having front and rear wheels, means to support the wheels, resilient means associated with the means to support the wheels, a superstructure, front and rear connecting means between the superstructure and the means to support the wheels, means including radius rods to maintain the wheels in a substantially predetermined longitudinally spaced relation relative to the superstructure, and connecting means between the last named means and the superstructure cooperating with the connecting means between the superstructure and the means to support the wheels to induce the superstructure to assume a substantially inclined or banked position accompanied by a lateral shifting and a lowering of the center of gravity of the superstructure relative to the wheels when subjected to lateral forces.

10. A motor vehicle comprising front and rear wheel supporting means, resilient means associated with said wheel supporting means, a longitudinally extending superstructure, radius rods between the wheel supporting means and superstructure paired angularly inclined front and rear links interposed between said wheel supporting means and superstructure, connecting means between said front and rear links, and means including an angularly inclined member connecting the superstructure to said connecting means between the front and rear links to induce longitudinally spaced points of the superstructure to shift laterally in unison to an inclined position when subjected to lateral forces.

JOACHIM KOLBE.